United States Patent [19]
Bonerb

[11] Patent Number: 4,722,655
[45] Date of Patent: Feb. 2, 1988

[54] BULK STORAGE BIN FOR FREIGHT VEHICLE OR OTHER STORAGE FACILITY

[76] Inventor: Timothy C. Bonerb, 400 Girdle Rd., East Aurora, N.Y. 14052

[21] Appl. No.: 33,744

[22] Filed: Apr. 3, 1987

[51] Int. Cl.⁴ ............................ B60P 1/16; B60P 1/56
[52] U.S. Cl. .................................... 414/288; 105/243; 222/166; 296/181; 298/1 B; 298/24; 414/469; 414/470
[58] Field of Search ............... 414/469, 470, 472, 473, 414/491, 495, 304, 328, 329, 519, 520, 288; 105/243, 247, 239, 355; 298/1 B, 24; 296/39 R, 181, 100; 222/166

[56] References Cited

U.S. PATENT DOCUMENTS

| | | | |
|---|---|---|---|
| 612,053 | 10/1898 | Penn et al. | 298/24 X |
| 2,712,797 | 7/1955 | Woehrle et al. | 296/39 R |
| 2,829,803 | 4/1958 | Paton | 222/95 |
| 3,659,899 | 5/1972 | Phillips et al. | 298/1 A X |
| 3,711,157 | 1/1973 | Smock | 298/8 R |
| 3,738,511 | 6/1973 | Lemon et al. | 105/243 X |
| 3,756,469 | 9/1973 | Clark et al. | 105/243 X |
| 3,773,379 | 11/1973 | Loiseau | 296/100 X |
| 3,784,255 | 1/1974 | Smock | 298/8 T |
| 3,918,604 | 11/1975 | Kersten | 105/243 X |
| 3,941,258 | 3/1976 | Ide | 414/304 |
| 4,092,051 | 5/1978 | D'Orazio | 298/24 |
| 4,155,469 | 5/1979 | Cole | 105/243 X |
| 4,330,948 | 5/1982 | Gasseling | 414/304 X |
| 4,453,875 | 6/1984 | Johnson, Sr. | 414/304 |
| 4,497,259 | 2/1985 | Titterton | 105/243 X |
| 4,534,596 | 8/1985 | Bonerb | 105/243 X |
| 4,541,765 | 9/1985 | Moore | 414/304 X |
| 4,557,400 | 12/1985 | Clarke | 105/243 X |
| 4,572,579 | 2/1986 | Saito | 298/1 A |
| 4,606,570 | 8/1986 | Neumann | 105/243 X |
| 4,643,475 | 2/1987 | Neumann | 105/243 X |

FOREIGN PATENT DOCUMENTS 2512790 3/1983 France.
115821 9/1979 Japan.

OTHER PUBLICATIONS

Brochure Entitled "Round-trip Loads Return Round-trip Profits in the All-new Design Model 4-V Convertible Dry Bulk/General Cargo Van" by Converta-Vans, Inc., undated.

Primary Examiner—Robert J. Spar
Assistant Examiner—David A. Bucci
Attorney, Agent, or Firm—Bernard, Rothwell & Brown

[57] ABSTRACT

A bin for storing and handling bulk material includes a fill opening through which material is introduced into the bin for storage and a discharge opening in a bottom portion of the bin through which material stored in the bin is discharged. The bin is erectable over a flat support bed. The bin includes an upright frame that is positionable adjacent to a discharge area of the flat bed to bring the discharge opening of the bin into alignment with the discharge area of the flat bed. The bin includes an outer shield hinged in a lower portion of the frame so that the shield pivots between a closed vertical position against one side of the frame and an open horizontal position away from the frame. The bin includes a floor panel independently hinged inside the outer shield adjacent the discharge opening of the bin, the bin floor panel being pivotable with the outer shield from the horizontal open position to the vertical closed position. The bin further includes a flexible bin wall portion connecting the frame and the bin floor panel to form an enclosure for storage of bulk materials when the bin is in the open position. Flexible bin wall portion is foldable into the frame when the outer shield and the bin floor panel is moved from the open position to the closed position. The bin includes an inflatable bag between the outer shield and the bin floor panel for independently inclining the floor panel toward the discharge opening when the outer shield is in the horizontal open position to direct bulk material stored in the bin through the discharge opening.

32 Claims, 22 Drawing Figures

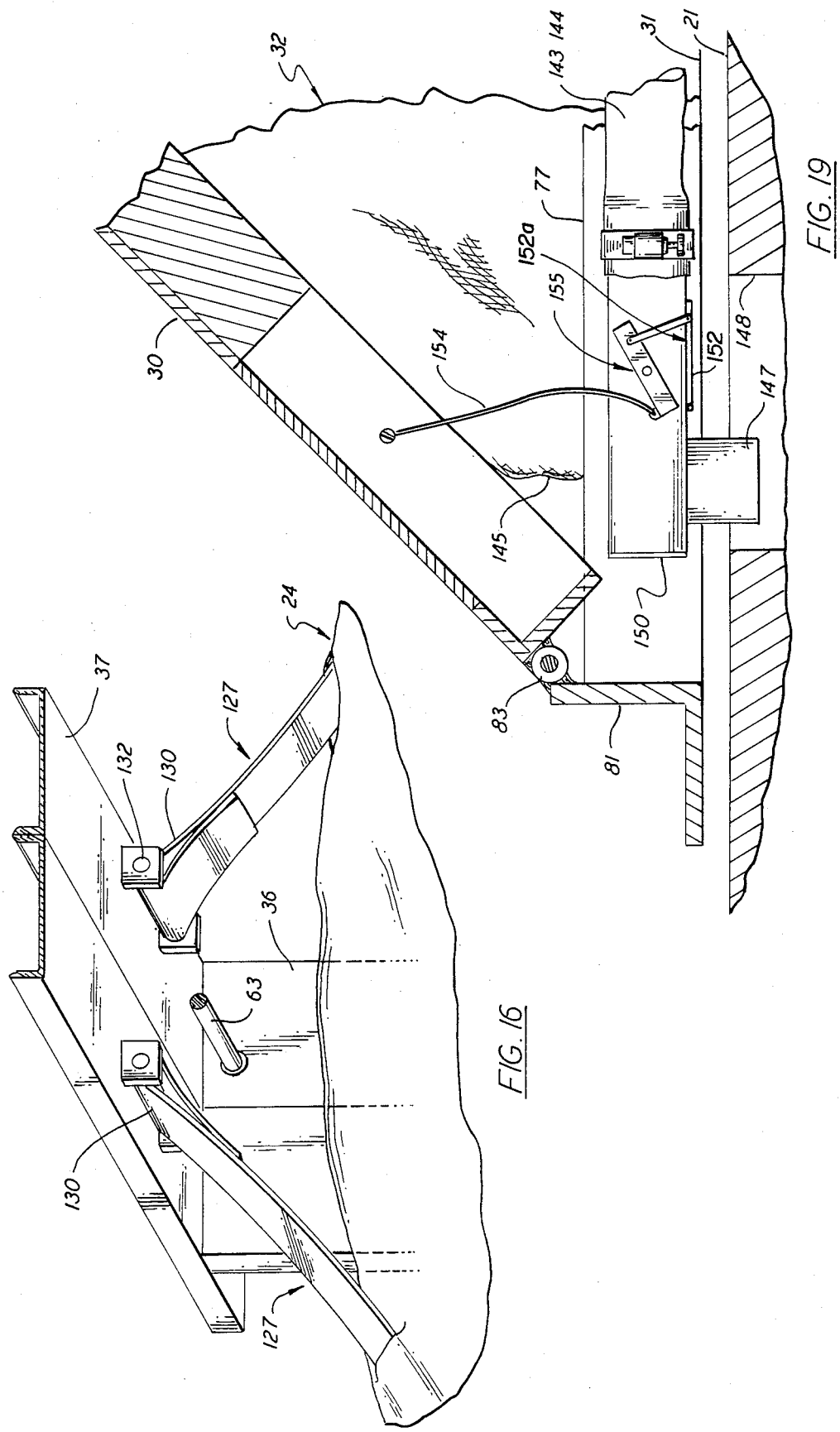

BULK STORAGE BIN FOR FREIGHT VEHICLE OR OTHER STORAGE FACILITY

BACKGROUND OF THE INVENTION

1. Field of the Invention

The present invention relates to a bulk storage bin for a freight vehicle or other storage facility.

2. Description of the Background Art

Granular material in bulk form, such as sugar, grains and the like, often are stored in stationary silos and transported in specially designed bulk freight vehicles. Such storage and transport containers often have rigid walls and bottoms made of metal or some other rigid material. A discharge port generally is provided in the bottom of such a container, which, when opened, permits the material in the container to flow out. From the discharge port, the material may be conveyed by any suitable conveying means. If the bottom of the container, extending from the discharge port to the walls, is flat or horizontal, not all of the granular material will be discharged through the discharge port by gravity. It is a characteristic of granular material contained in a flat-bottomed container to stop flowing out of a discharge port when the material remaining in the container is at an angle of repose. The material remaining in the container after discharge by gravity often forms a cone shape inside the container. The inner face of this cone shape, formed by the granular material, extends from the discharge port in the bottom of the container upward at an angle to the wall of the container. The angle of repose at which this cone shape occurs and discharge by gravity ends depends on the physical characteristics of the bulk material involved.

To facilitate the discharge of the entire content of a bulk storage container, silos and bulk freight vehicles often are provided with hopper bottoms. Such hopper bottoms are generally cone-shaped, extending upwardly from the discharge port at an angle towards the bulk container walls. The angle at which the hopper bottom projects from the discharge port to the walls of the storage container is intended to be sufficient to prevent the material in the bin from resting in a cone shape at an angle of repose and to avoid bridging, rat-holing and the like of the material so that the entire contents of the storage container is directed towards the discharge port for removal. A storage container with a hopper bottom has a higher center of gravity than the same sized bin with a flat bottom. This higher center of gravity may not be a significant problem in stationary silos, but may be of greater importance in a mobile bulk freight vehicle. Moreover, a hopper-shaped storage container is expensive and wasteful of space.

It is highly desirable to have a cargo space of a freight vehicle that would be suitable for handling either bulk goods or piece goods such as palletized packages and the like. The obvious advantage is that the same cargo space on the same vehicle could handle either of these two significantly different types of loads. Convertibility of cargo space provides extreme flexibility and avoids empty runs of the vehicle. For example, a truck-trailer could handle piece goods such as palletized bags of sugar on one run and on a return run could handle bulk goods such as sugar in the bulk going back to the packaging factory; a plastics company could send finished goods in standard cargo space and return with a bulk load of resins; a brewer could send kegs or cases of beer and bring back malt or grains in the same vehicle, and there are many other uses of a similar nature.

The economic advantages of convertible freight vehicles have sparked an increased interest therein in recent years. For example, a van sold by Converta-Vans, Inc. of Wescoville, Pa., provides a cargo space with four separate convertible bulk hoppers covered by hinged floor sections in the piece goods mode, the hinged floor sections being raisable to provide wall sections that slope towards the hoppers in the bulk mode for gravity discharge of bulk materials through the hoppers. These hoppers make the van expensive and heavy, and the weight contributes to the energy expenditure of hauling. Also, the hinged floor sections that form sloping walls in the bulk mode raise the center of gravity of the load. Moreover, general cargo vans are not easily converted to the Converta-Van configuration due to the necessity of providing the hoppers.

Other hopper-type freight vehicles that are convertible from a bulk-handling mode to a piece goods handling mode are shown in U.S. Pat. Nos. 3,738,511; 3,756,469; 4,092,051; 4,155,469 and 4,606,570.

One proposal for a convertible freight vehicle that avoids the necessity of hoppers is shown in U.S. Pat. No. 2,712,797 to Woehrle et al. In Woehrle, a cargo space for piece goods in a van-type body is converted to a cargo space suitable for the transportation of bulk goods by providing a liner for the cargo space with a rear discharge spout. For discharge of bulk materials, the van-type body of the freight vehicle is tiltable in the manner of a dump truck. However, a tilting mechanism that tilts an entire loaded van-type body would necessarily be quite expensive and add considerable undesired weight to the vehicle.

A freight vehicle with a convertible cargo space that requires neither a hopper bottom nor a dump truck-like tilting mechanism is shown in U.S. Pat. No. 4,534,596 to Timothy C. Bonerb, the inventor of the present invention. The freight vehicle disclosed in U.S. Pat. No. 4,534,596 modifies a conventional cargo space for piece goods by providing openings in the roof and floor for filling and discharging bulk material. One or more double-walled inflatable bags having their bottoms attached to rigid support platforms are positioned in erected condition to handle bulk material and are movable to a stored position near the roof of the cargo space to allow handling of piece goods.

Other bulk unloading system that do not require fixed hoppers are shown in U.S. Pat. No. 4,541,765 to Moore and U.S. Pat. No. 2,829,803 to Paton. The Moore apparatus includes a collapsible rectangular liner having a collapsible funnel-shaped base wherein after partial discharge, the collapsible liner is raised to extend the collapsible funnel-shaped base above the angle of repose of the bulk material and thereby complete discharge of the bulk material. The Paton system employs a flat bottom and flexible walls, and means for changing the relative pressure between air within the container and are on the outer surface of the flexible walls of the container. This change in relative air pressure causes inward movement of the flexible walls which raises the flat bottom portion thereby sloping the flat bottom portion to complete discharge of the bulk material.

Other dump-type systems are known in the art. For example, a mechanically actuated dump system for emptying a freight vehicle through a fixed hopper is shown in U.S. Pat. No. 612,053. Dump systems showing inflatable tilting means are shown in U.S. Pat. Nos. 3,659,899; 3,711,157; 3,784,255 and 4,572,579.

In view of the economic advantages and increased interest in convertible freight vehicles, there remains a need in the art for improvements in bulk storage bins for freight vehicles or other storage facilities.

SUMMARY OF THE INVENTION

In accordance with the present invention, a bin for storing and handling bulk material includes a fill opening through which material is introduced into the bin for storage, and a discharge opening in a bottom portion of the bin through which material stored in the bin is discharged. The bin is erectable over a flat support bed, and includes an upright frame that is positionable adjacent to a discharge area of the flat bed to bring the discharge opening of the bin into alignment with the discharge area of the flat bed. The bin includes an outer shield hinged in a lower portion of the frame so that the shield pivots between a closed vertical position against one side of the frame and an open horizontal position away from the frame. A bin floor panel is independently hinged inside the outer shield adjacent the discharge opening of the bin, the bin floor panel being pivotable with the outer shield from the horizontal open position to the vertical closed position. The bin further includes a flexible bin wall portion connecting the frame and the bin floor panel to form an enclosure for storage of bulk materials when the bin is in the open position. The flexible bin wall portion is foldable into the frame when the outer shield and the bin floor panel is moved from the open position to the closed position. The bin further includes an inflatable bag between the outer shield and the bin floor panel for independently inclining the floor panel toward the discharge opening when the outer shield is in the horizontal open position to direct bulk material stored in the bin through the discharge opening.

BRIEF DESCRIPTION OF THE DRAWINGS

FIG. 16 is an enlarged perspective view with portions broken away showing details of the straps used to suspend the flexible wall portion of the bin between the frame and the foldable support system.

FIG. 19 is an enlarged side elevation view in partial section with portions broken away showing details of the inflation control system of the air bag.

DETAILED DESCRIPTION OF THE PREFERRED EMBODIMENTS

Figure 1:
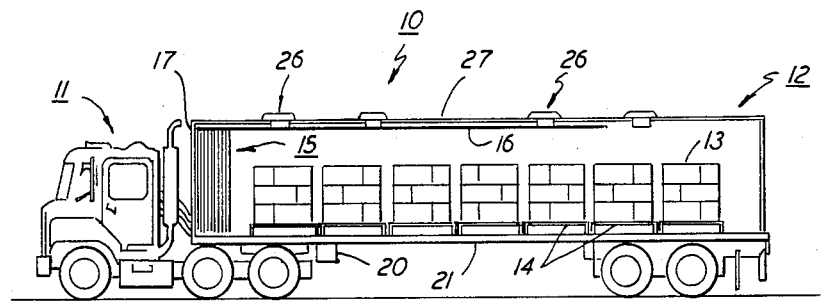
FIGS. 1-4 are side views, with wall portions broken away for clarity, showing a mobile cargo container that is equipped with a pair of flexible walled bulk storage bins embodying the teaching of the present invention.
Figure 2:
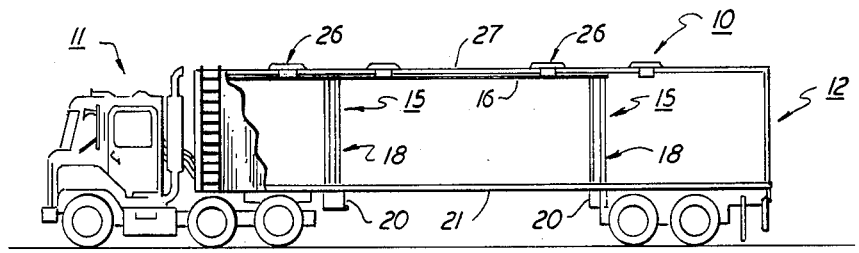

Referring initially to FIGS. 1-4, there is shown a freight vehicle 10 that in the embodiment illustrated includes a tractor 11 having an engine and drive wheels, and a detachable cargo container 12 in the form of a semi-trailer, although it could be any other cargo space such as a rail car or the like. In the embodiment shown, the container is rectangular in shape and is dimensioned to permit it to be transported over the roads or to be carried piggyback on either a train or a ship as may be required. In FIG. 1, the container is shown loaded with piece goods 13 that are stacked upon pallets 14 and tied down in a conventional manner for shipping. Typically, the container is loaded at a manufacturer's plant and the goods transported to a buyers facility at some remote location where it is unloaded. Ideally, the empty container will then be reloaded on the return trip with raw materials needed in the production of the goods. However, many products, such as packaged foods, require the use of bulk materials in their manufacture. These bulk materials may include salt, sugar, grains and the like, that normally cannot be easily handled using a conventional flat-bottomed container. Under these conditions, the container often is required to return empty.

A mobile cargo container 12 according to the invention is quickly converted to a bulk carrier for transporting, storing, handling and discharging bulk free-flowing materials or granular, powdered or flaked materials or grains of varying degrees of flowability or susceptibility to caking, bridging or rat-holing.

In the embodiment shown, a pair of foldable bulk storage bins 15 are suspended on rails 16 secured to the top wall or roof 27 of the container. When not in use, the units can be stowed against the front wall 17 of the container as shown in FIG. 1. Each storage unit folds into a thin upright bin frame 18 that, for example, is about twelve inches wide and has a height that advantageously is slightly less than the interior height of the container. When stowed in the front of the container, the units take up very little cargo space and leave all but the very front of the container accessible for ready loading or unloading of cargo. To convert the cargo container to a bulk carrier, each unit is moved back along the rails to an operative position over a discharge area in the bed 21 of the container. In the embodiment shown, the discharge area in the bed is in the form of a slot-like trough 20 in the bed 21 of the container.

Figure 3:
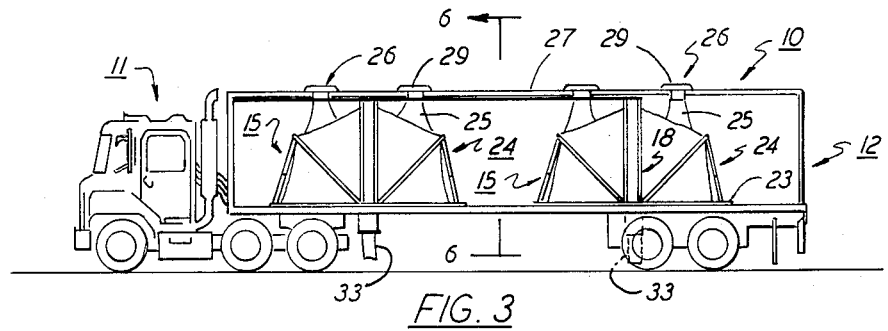

Once seated on the container bed over the troughs 20, the bins are unfolded as illustrated in FIG. 3, by lowering a pair of hinged opposing side assemblies 23 to a horizontal position against the bed 21. The lowering of the side assemblies 23 unfolds a flexible bin wall portion 24 into a relatively large tent-like structure that is capable of holding a quantity of bulk material. The walls of the bin are constructed of a flexible material that is lightweight, yet strong enough to retain a quantity of stored particulate material without rupturing. A pair of foldable loading funnels 25 are connected to corresponding fill openings in the top wall of each storage bin. The funnels are extended upwardly for loading through hatches 26 mounted in the roof 27 of the cargo container. Each hatch has a cover 29 that is removed during loading to permit a loading funnel to be brought out of the hatch. The raised funnels are folded over the hatch plates and the bulk material is gravity fed therethrough into the bins.

When the loading operation is completed, the funnels are closed off and folded back into the bins to prevent them from being damaged, and the hatch covers are closed.

Figure 4:
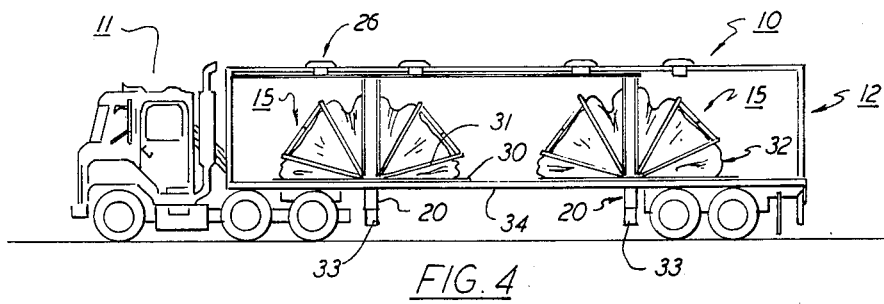

To unload the stored bulk material, a flexible spout 33 that is centrally positioned in the bottom of each bin and connected to the discharge opening of the bin is pulled through an aligned discharge trough in the bed of the trailer, and the bulk material is permitted to flow out of the bin to the extent allowed by gravity into an unloading conveyor (not shown). Each hinged side assembly 23 is comprised of an outer shield 31 that is hinged to a lower portion of the upright bin frame 18, and an inner bin floor panel 30 that is independently hinged inside the outer shield adjacent the discharge opening of the bin and pivotable with the outer shield. An inflatable air bag 32 is mounted between each outer shield and the corresponding bin floor panel. The air bags 32 are sequentially filled with low pressure air to individually and gradually raise the floor panels to an inclined position as shown in FIG. 4. The inner floor panel thereby forms an inclined wall for directing stored bulk material contained in the bin through the discharge opening of the bin and the trough in the bed. After the unloading operation is completed, the spout is folded into the associated bin and stored therein. When not needed for bulk storage, the bins are folded into the positions shown in FIG. 2 by raising the outer shields to the vertical closed position and thereby folding the corresponding floor panels and associated flexible bin wall portions into the frames. The folded bin can then be stowed in the front of the freight container.

A bin in accordance with one embodiment of the invention will now be discussed in greater detail. According to this embodiment, the upright frame 18 of each storage bin includes a pair of spaced apart vertical side beams 35 and 36 that are joined by a horizontal top beam 37. See FIG. 6. The upright frame is suspended from the cross-member 38 of an overhead carriage 39 by a pair of threaded hangers 40 (shown in detail in FIG. 7) mounted in the outboard ends of the top beam 37. The carriage is supported in the overhead rails 16 upon rollers 42. The rails are secured by any suitable means in parallel alignment in either the roof or the sidewalls of the container and extend along the length of the container a sufficient distance to permit the two storage units to be conveyed from the stowed position at the front of the container to an operative position over one of the discharge troughs 20 to bring the discharge opening of the bin into alignment with the discharge trough 20 in the bed.

The shank 43 of each threaded hanger 40 is rotatably mounted in the cross-member 38 of the carriage so that it can turn freely therein. The lower portion of the shank is contained in a threaded bushing 44 carried in the top beam of the frame and a wheel 45 for turning the hanger 40 is connected to the lower part of the shank. By turning the hangers on opposite sides of a bin, the suspended frame can be lowered into seating contact against the bed of the container.

Figure 7:
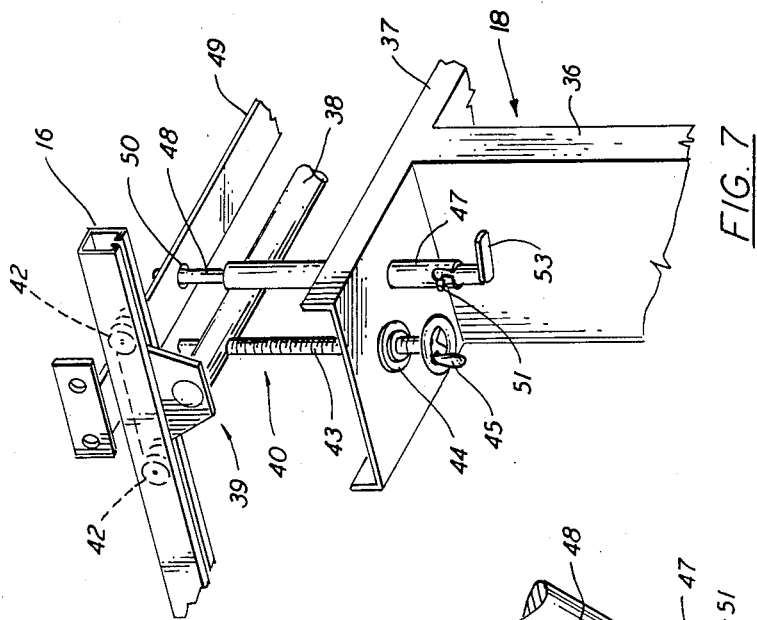
FIG. 7 is an enlarged partial perspective view with portions broken away showing details of the frame of a bulk storage unit suspended from an overhead carriage.
Figure 8:
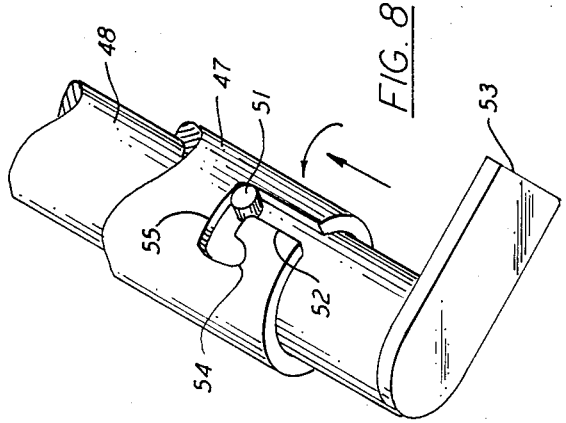
FIG. 8 is a perspective view with portions broken away showing deails of an extendable locking bar that is mounted in the frame for registering and locking the frame over a discharge trough.

A hollow vertically disposed sleeve 47 is also carried at each end of the top beam 37 which slidably contains a locking bar 48. Alignment of locking bar 48 with sleeve 47 accurately positions the frame over a discharge trough, and stabilizes the frame when in an operative position. A stationary member 49 is affixed between the sidewalls of the container over each trough 20 and contains a locating hole 50 for receiving the locking bar 48 therein when the frame is registered over the trough. As best seen in FIGS. 7 and 8, the locking bar 48 has a radially disposed pin 51 that rides in a J-shaped slot 52 formed in the sleeve 47. A crank arm 53 is secured to the lower end of the rod by which the operator can move the rod within the sleeve. To register one of the storage bins over a discharge trough 20, the carriage is rolled along the rails until the frame is located over the trough. The locking bar 48 then is guided upwardly into the locating hole 50. The crank arm 53 then is rotated about its axis to guide the pin 51 laterally along horizontal passage 55 of the slot into seat 54 thus securing the bar in a locked condition. With the rod locked in place, the frame is lowered using the threaded hangers 40 to seat the frame upon the bed of the container with the discharge opening of the bin in alignment with the trough in the bed. The axial length of the locking bar 48 is such that it will not pass out of the locating hole 50 as the frame is being lowered to the bed.

Figure 9:
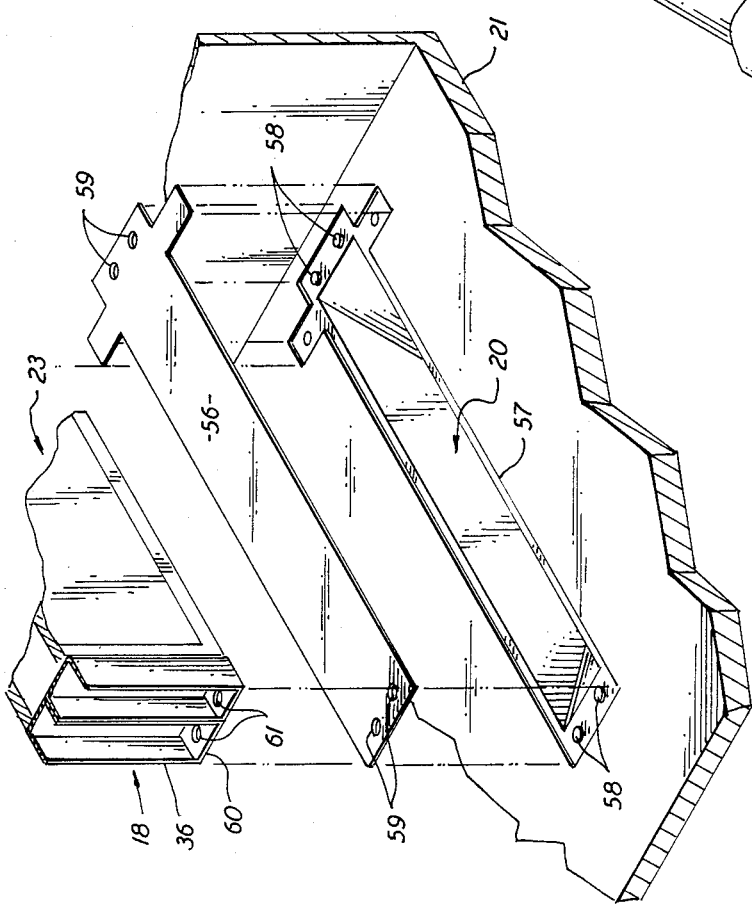
FIG. 9 is a perspective view with portions broken away of a discharge trough and cover plate assembly used in association with a bulk storage bin.

As illustrated in FIG. 9, the entrance to each trough 20 is covered by a floor plate 56 when the bins are in a stowed position at the front of the freight container. The floor plate is fitted into a recess 57 which surrounds the trough entrance. Raised registration pins 58 are provided in each recess which are received in holes 59 formed in the floor plate. The floor plate is removed prior to locating a bulk storage bin over the trough. Each of the side beams 35 and 36 of the upright frame 18 contains a gusset plate 60 welded to the bottom thereof. Each gusset plate has a pair of registration holes 61 that slidably receive the registration pins 58 therein. As the frame is lowered from the carriage, the gusset plates are slipped into the recess 56 where they engage the registration pins to locate and lock the upright frame 18 in place over the trough.

The discharge trough 20 has an elongated slot-like entrance that extends laterally across the bed of the container. The width of the trough at the entrance is small enough so that the trough can be fitted between existing laterally disposed structural beams mounted in the bed of the container. The troughs usually can be fitted to existing containers without having to cut or otherwise rearrange the supporting beams thereby preserving the structural integrity of the container. Accordingly, an existing container will not be weakened or otherwise damaged by the installation of the present bulk storage system.

Figure 5:
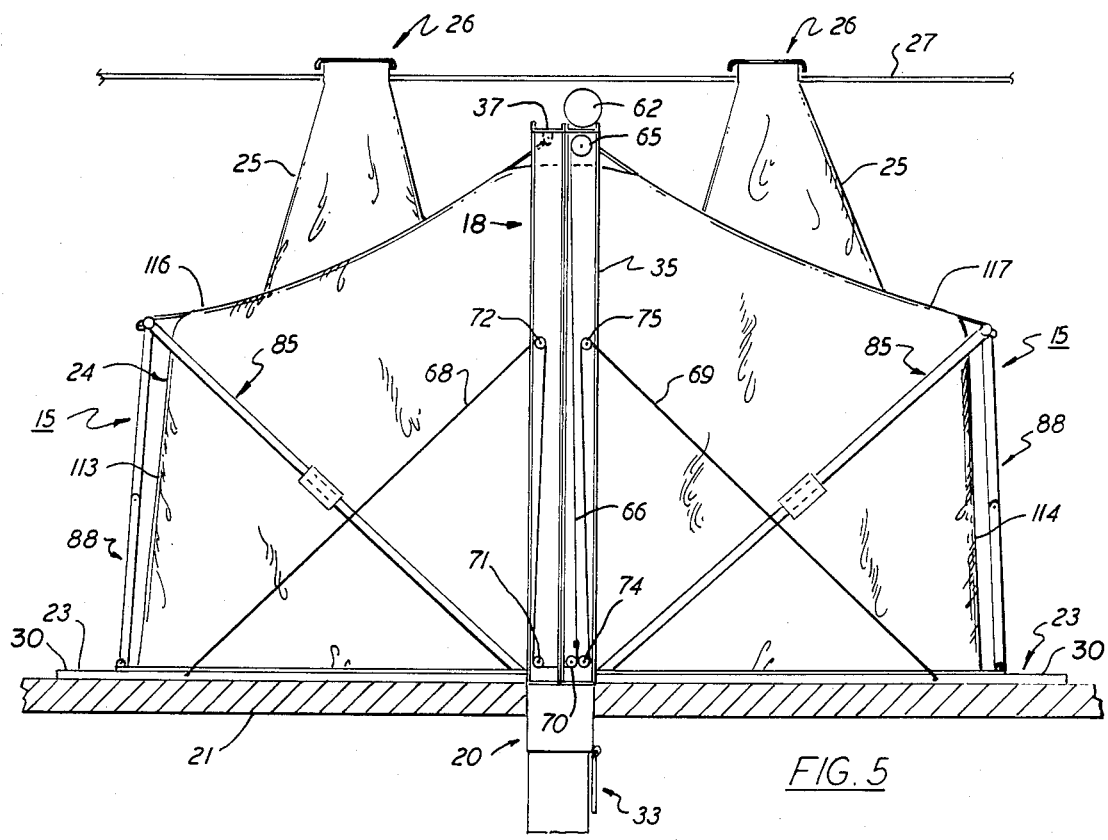
FIG. 5 is an enlarged side elevation view of one of the bulk storage bins showing the bin in an unfolded condition inside the mobile cargo container with loading funnels and discharge spout of the flexible walled bin in an extended position.
Figure 6:
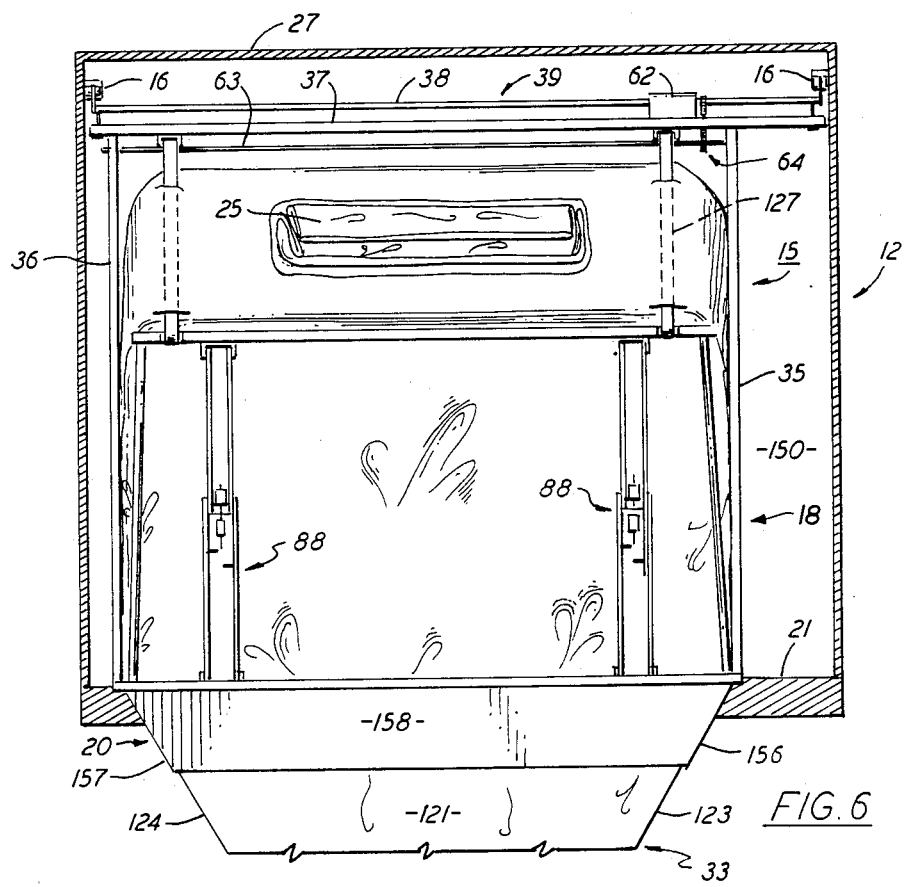
FIG. 6 is an enlarged end view taken along lines 6—6 in FIG. 3.

When a folded bin is seated over one of the troughs, it is opened by lowering the two opposing side assemblies 23 including outer shield 30 and bin floor panel 31 to a horizontal position in contact with the bed of the freight container. A reversible motor 62 is mounted upon the top beam 37 of the upright frame 18 as shown in FIGS. 5 and 6. The motor is connected to a horizontal drive shaft 63 by means of a gear train 64. The drive shaft, which is journaled for rotation in the opposed side beams 35 and 36 of the upright frame, passes through each side beam and has a sheave 65 keyed to each end of the shaft. A flexible belt 66 is wound upon each sheave and is attached at its lower end to a pair of cables 68 and 69. Cable 68 is trained over pulleys 70, 71 and 72 and is attached to the outside of the outer shield 30 of the left-hand side assembly as viewed in FIG. 5. Cable 69 is similarly trained over pulleys 74 and 75 and is attached to the outer shield 30 of the opposing side assembly. The belts are arranged on the sheaves 65 so that the two side assemblies are lowered and raised in unison in response to the reversible motor 62.

As noted above, the side assemblies 23 of each bulk storage bin contain an outer shield 30 and an inner bin floor panel 31. The outer shield 30 protects its associated inflatable bag from puncture by objects or projections on the bed of the freight container, and can be formed of any suitable material, such as lightweight sheet aluminum. Outer shield 30 has a raised lip 77 formed of angle iron that extends about its periphery. See FIG. 10. The bin floor panel 31 is formed of a suitably stiff, lightweight material, and is adapted to be recessed within the lip of the outer shield. The outer shield is pivotally supported between the horizontal beams 35 and 36 of the upright frame by means of opposed pivot pins 80 whereby the panel can be raised and lowered about the pin by the above-described cable system. See FIG. 11. A laterally disposed plate 81 is welded inside the lip of the outer shield and runs across the width of the shield. Spaced hinges 83 are secured to the top of the plate 81 which function to pivotally support the bin floor panel to the back of outer shield so that the floor panel can be moved independently within the side assembly.

Figure 13:
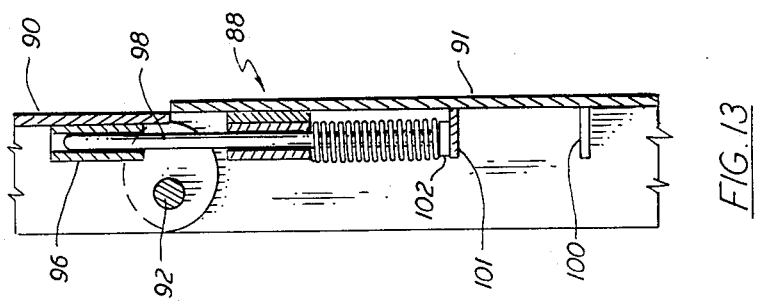
FIG. 13 is a cross-sectional view of the foldable support shown in FIG. 12.
Figure 12:
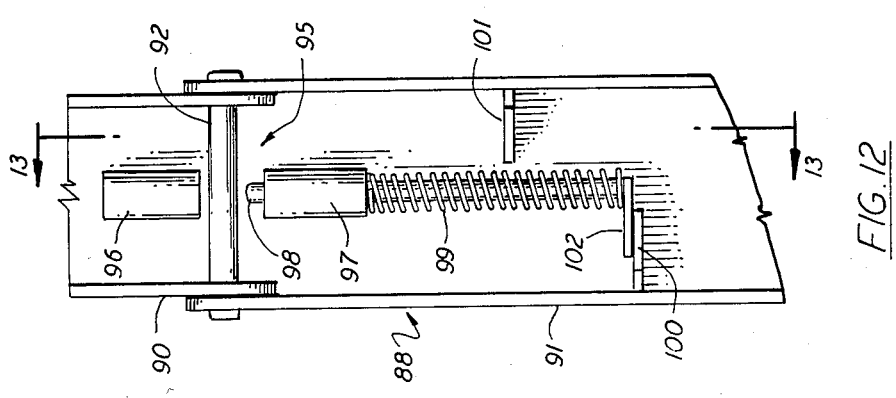
FIG. 12 is an elevation view with portions broken away showing details of the foldable support system used to hang the flexible wall bin.

A U-shaped tubular bracket 85 is pivotally mounted on the back of the floor panel by means of a pair of clevis units 86 that are spaced apart near the lower edge of the panel. See FIG. 10. The base leg 87 of the bracket is attached to the back edge of the floor panel by two foldable braces 88. As illustrated in FIGS. 12 and 13, braces 88 include an upper channel member 90 that is fitted inside a lower channel 91. The two members are joined by a shaft 92 so that each brace can be folded inwardly at about its midsection. The upper end of each column is pivotally attached to the base leg of the bracket by a clevis and pin unit 93 while the lower end of the column is similarly attached to the floor panel by a second clevis and pin unit 94. See FIG. 10.

Each foldable brace 88 is secured in a straight or unfolded condition by means of a manually operated latch mechanism generally referenced 95 (shown in detail in FIGS. 12 and 13). The latch mechanism includes a pair of sleeve members 96 and 97 welded to the inside of the opposed channels making up each brace. When the channels are rotated into an unfolded condition, the two sleeve members are in axial alignment. A locking bolt 98 is slidably contained within the lower sleeve member 97 and a spring 99 is wound about the lower part of the bolt. The spring acts between the lower sleeve member and the expanded head 102 of the bolt to urge the bolt into a release position as shown in FIG. 12. A first stop 100 is provided to intercept the bolt head and thus retain it in the release position. The brace is locked in an unfolded position as shown in FIG. 13 by sliding the bolt 98 upwardly into the upper sleeve member 96 and rotating the head of the bolt so that it now seats against a second raised stop 101.

Figure 14:
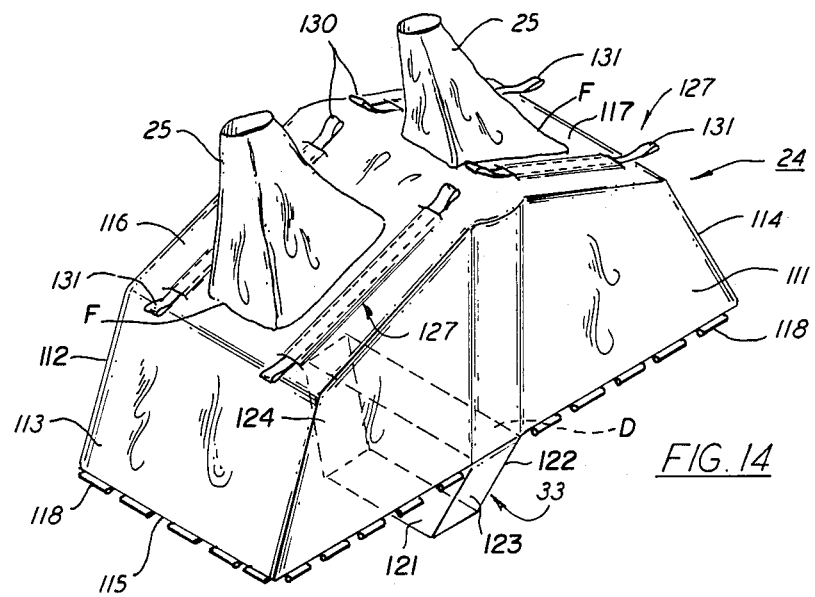
FIG. 14 is a perspective view showing the flexible wall portions of the bin in an unfolded condition, apart from the frame and other structural parts of the bin.
Figure 15:
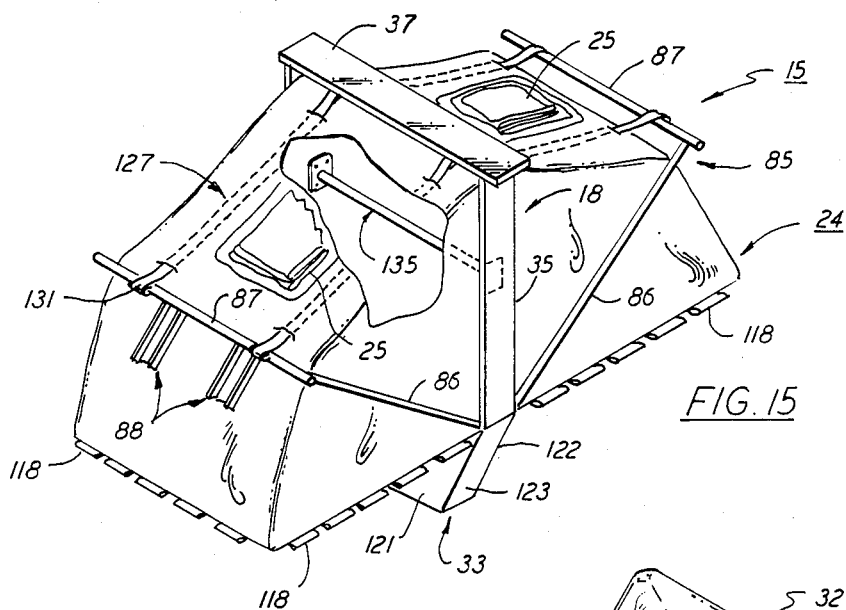
FIG. 15 is also a perspective view of the unfolded bin wall portion shown in FIG. 14 suspended between the frame and the foldable support system.

A flexible bin wall portion 24 is suspended between and connects the upright frame 18 and the bin floor panel 31 to form an enclosure for storage of bulk materials. The flexible bin wall portion 24 is foldable into the upright frame 18, and is illustrated in detail in FIGS. 14 and 15. The flexible bin wall portion 24 is shown in a fully extended condition in FIG. 14 and is comprised of a tent-like enclosed body that includes sidewalls 111 and 112, end walls 113 and 114, a floor 115 and two top wall sections 116 and 117. A series of spaced apart cylindrical tabs 118 are attached to the body of the flexible bin wall portion 24 about the perimeter of the floor 115. As will be explained below, the tabs are used to connect the bin to the opposed bin floor panels of each side assembly. A flexible funnel 25 is connected to a fill opening F in each top wall section 116 and 117. As shown in FIG. 3, the funnel can be raised through the roof hatches of the container to provide loading access to the bins.

The discharge spout 33 forms part of the bin floor and is centrally located in the floor. The spout is connected to the discharge opening D of the bin, and includes a pair of parallel sidewalls 121 and 122 and a pair of tapered end walls 123 and 124 which coact to give the spout a funnel-like configuration. As best seen in FIG. 6, the geometry of the spout complements the shape of the discharge trough 20. In practice, the spout is pulled through the trough so that it hangs below the bed of the container as shown in FIG. 21 to provide a fully extended discharge chute through which material stored in the bin can be emptied.

Figure 21:
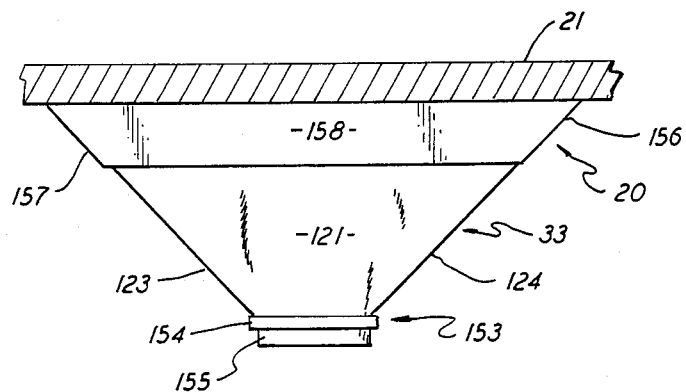
FIG. 21 is an elevational view showing the spout of a bin extending through a trough in the bed of a freight vehicle.

As shown in FIG. 21, the spout 33 of the flexible walled bin is pulled through a trough 20 in the bed 21 of a freight container. If desired, the trough can extend down about one half the distance from the bottom of the bed and the road surface upon which the wheels of the container ride. In the embodiment shown, the trough includes a pair of inwardly inclined end walls 156 and 157 that are joined to a pair of parallel walls 158 and 159. See FIGS. 18 and 21. The walls of the spout complement those of the trough so that the trough supports the entrance region to the spout when it is extended as shown. The spout is formed of the same flexible material as the bin and can be easily pulled through the trough when the bin is to be unloaded. After unloading, the spout is rolled up and passed back into the bin for safekeeping. Although not shown, elastic bands are attached to the floor of the bin at the spout entrance which are used to retain the stored spout inside the bin.

The spout terminates with a gate generally referenced 153 that can be opened and closed to control the release of particulate material from the bin into a conveyor or the like. See FIG. 21. The gate includes a rigid coupling 154 attached to the bottom of the spout and an adjustable diaphragm 155 mounted in the coupling. By turning the diaphragm in one direction, the discharge passageway of the spout can be adjusted between a fully closed position and a fully opened position. Although a diaphragm is shown in this embodiment of the invention, any suitable closure device such as a cap can be used in the practice of the present invention.

Figure 10:
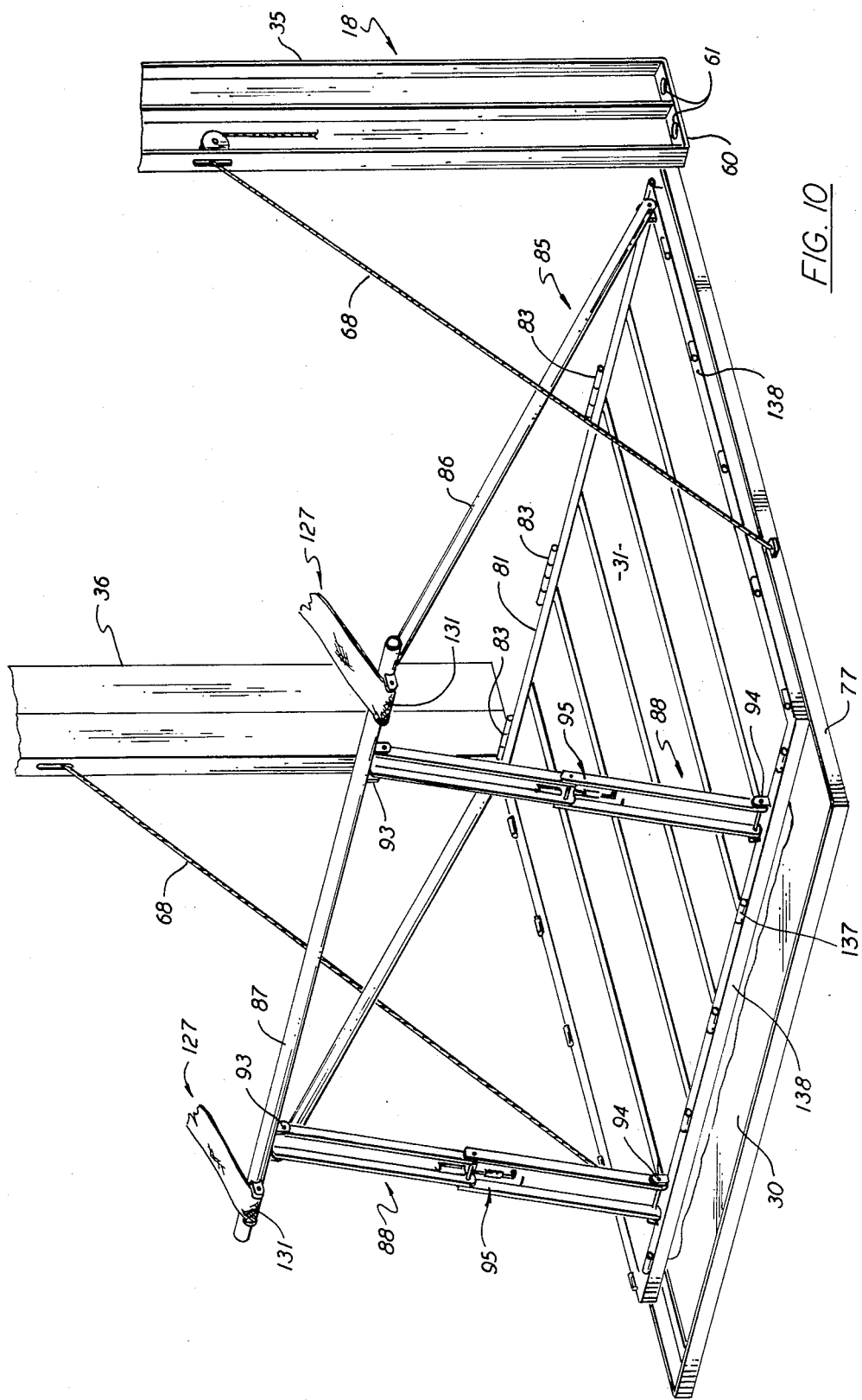
FIG. 10 is an enlarged perspective view, with portions broken away, showing details of the frame and a side assembly hinged thereto on one side, with the flexible wall portions of the bin removed from the frame.
Figure 11:
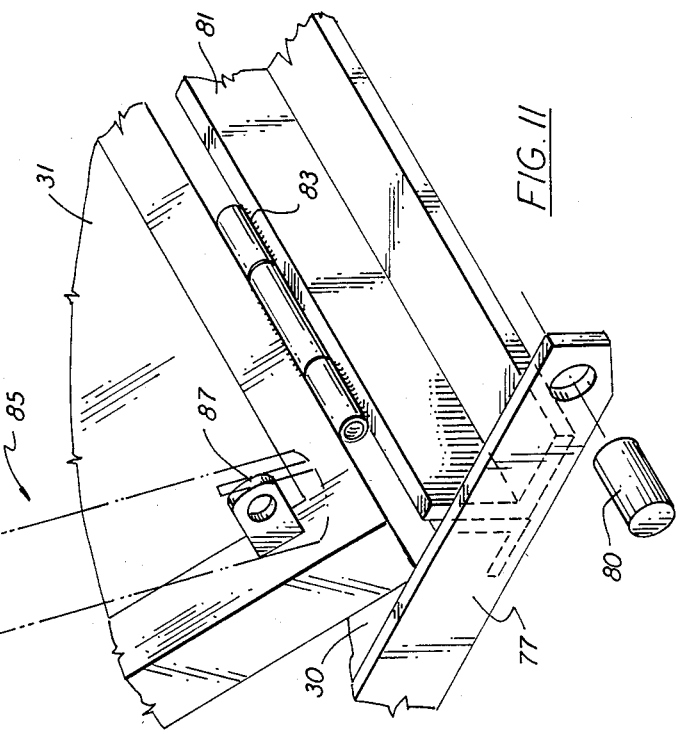
FIG. 11 is a perspective view with portions broken away showing details of the hinged section of the wall unit.

Referring back to FIGS. 14 and 15, a pair of parallel straps 127 are affixed by any suitable means to each roof section of the bin. The upper end of each strap contains a loop 130 while the opposing lower end of each strap contains second loop 131. As shown in FIG. 16, the upper loop of each strap is secured to the top beam 37 of the upright support frame 18 within a bracket 132. The lower loop of each strap, in turn, is passed over the base leg 87 of bracket 85. See FIG. 15. The straps, in assembly, serve to limit the extent of travel of the opposed brackets 85 when the bin is unfolded and thus support the roof of the bin when it is in an open condition to maintain the flexible wall portion in an erect position. With the support in an operating position, the braces 88 are latched in an unfolded condition as shown in FIG. 10 to rigidly attach the brackets 85 to the bin floor panels 31. A reinforcing bar 135 may also be positioned inside the bin and attached between the two vertical beams of the main support frame to provide added structural strength to the system. See FIG. 15.

The tabs 118 that surround the bottom rim of the bin wall position 24 are positioned to fall between eyelets 137 secured about the outer perimeter of the floor panels. See FIG. 10. Slide bars 138 are passed through the aligned tabs 118 and eyelets 137 to securely hold the floor of the bin to each of the floor panels.

Figure 17:
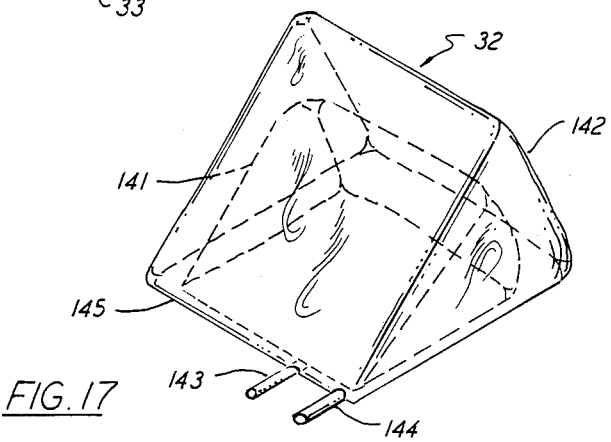
FIG. 17 is a perspective view of an inflatable air bag used to lift one of the floor panels of the bin.

An inflatable air bag 32 (shown in detail in FIG. 17) is secured by any appropriate means to the bottom of each floor panel so that it can act between the floor panel and the outer shield of each side assembly to tilt the floor panel towards the discharge opening of the bin. See FIGS. 18 and 19. Advantageously, the bag includes an inner bladder 141 and an outer bladder 142, having separate inflation lines 143 and 144, respectively. Inner bladder 141 provides a safety factor in the event that the outer bladder 142 ruptures, to prevent the floor panel from crashing down to the bed. In the embodiment shown, the bag is generally wedge-shaped with its apex 145 being located in assembly adjacent to the hinged edge 146 of the floor panel. Inflating the bag with low pressure air causes the floor panel to be pivoted about the hinges 83 to incline the floor panel toward the centrally located spout.

Low pressure air from a blower (not shown) is pumped into both bladders of the bag through air inlet tube 147. The tube is movably received in a hole 148 formed in the bed 21 of the container. The inlet tube is connected to a bifurcated distributor 150 (shown in more detail in FIG. 19) that empties into the inflation lines 143 and 144. A butterfly valve 152 is positioned in the distributor over pressure relief opening 152a. A lanyard 154 is attached at one end to the bin floor panel and at the other end to a lever arm mechanism 155 that is attached to the valve. When the inner floor panel reaches a predetermined angle with reference to the horizontal lifting shield (approximately 45°), the valve is opened to relieve the pressure inside the bag and thus prevent over pressurization of the bag.

Figure 18:
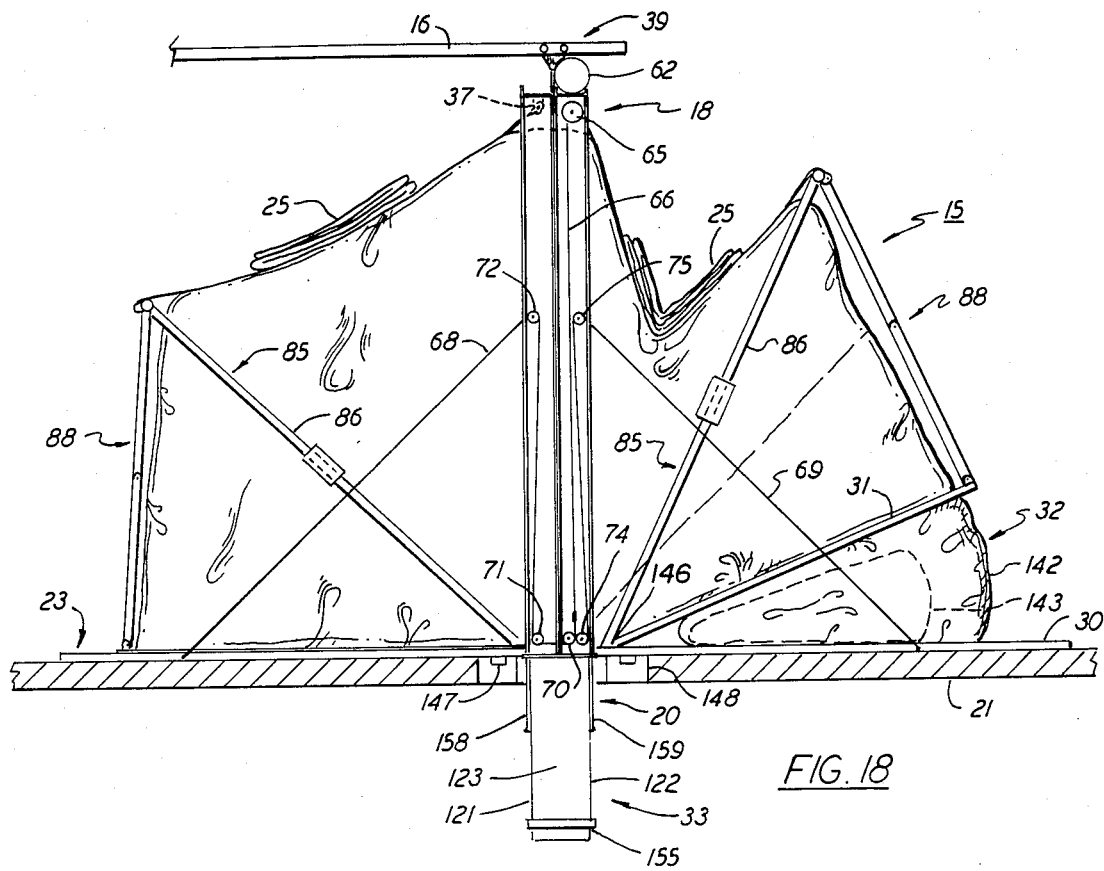
FIG. 18 is an enlarged side elevation view of a bulk storage bin according to the invention showing the inflated air bag lifting a floor panel.

As each floor panel is raised by the air bag during the bulk material unloading operation, the latched braces 88 apply a lifting action against the bracket 85 and, as a result, the entire lower section of the bin on one side of the frame is tipped toward the discharge spout as shown in FIG. 18. The air bags will continue to incline the floor panel to cause the material to flow. In this manner both sides of the bin can be sequentially emptied in a very short period of time.

Figure 20:
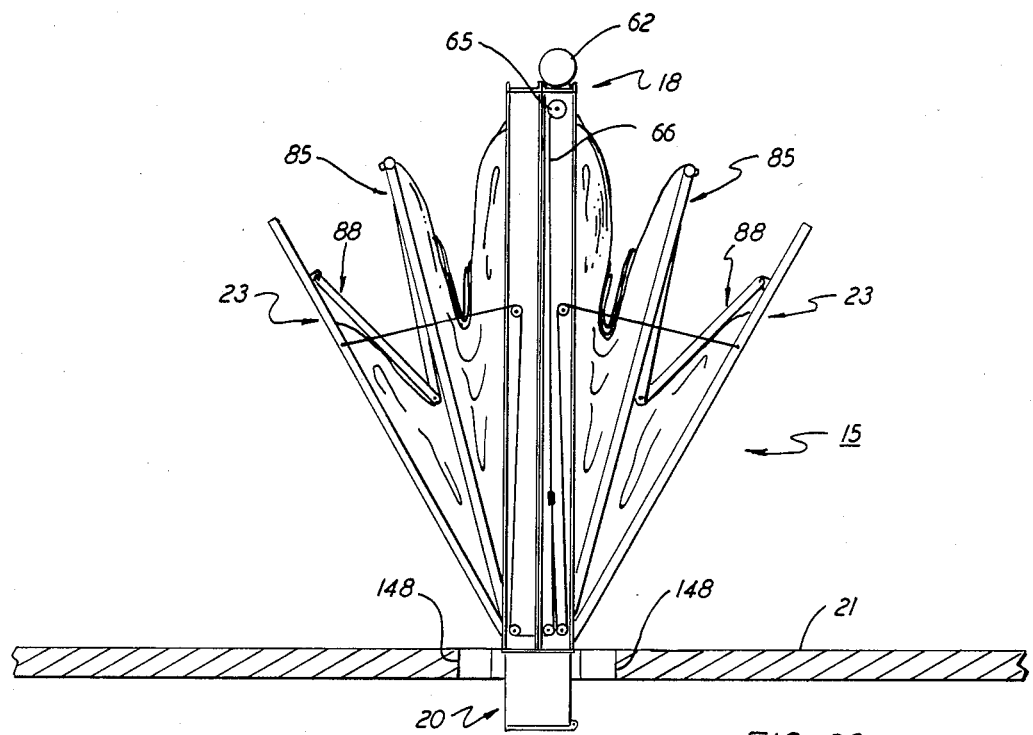
FIG. 20 is a side elevation view showing a bulk storage bin as it is being folded into the frame assembly.

With reference to FIG. 20, the foldable storage bin of the present invention is folded within the narrow upright frame 18 when the side assemblies are raised by the motor-actuated cable and pulley system. The two opposed side assemblies are arranged to close against the sides of the frame to protect the stored bin from damage. The closed frames can be easily moved to a desired stowed location within the mobile cargo container. Preferably, the units are stowed against the front wall of the unit so that cargo and cargo-handling equipment can freely and safely be moved about the container.

When utilized in a cargo container, the rectangular shaped bins allow for maximum utilization of space. As seen in FIG. 6, an aisle space 150 is provided between one sidewall of the freight container and the opposing sidewall of the bin to enable an operator to pass around a bin when the bin is in the operating position. In practice, the aisle space between the bins and the walls of the container are staggered between adjacent bins to more evenly distribute the cargo weight over the wheels.

Figure 22:
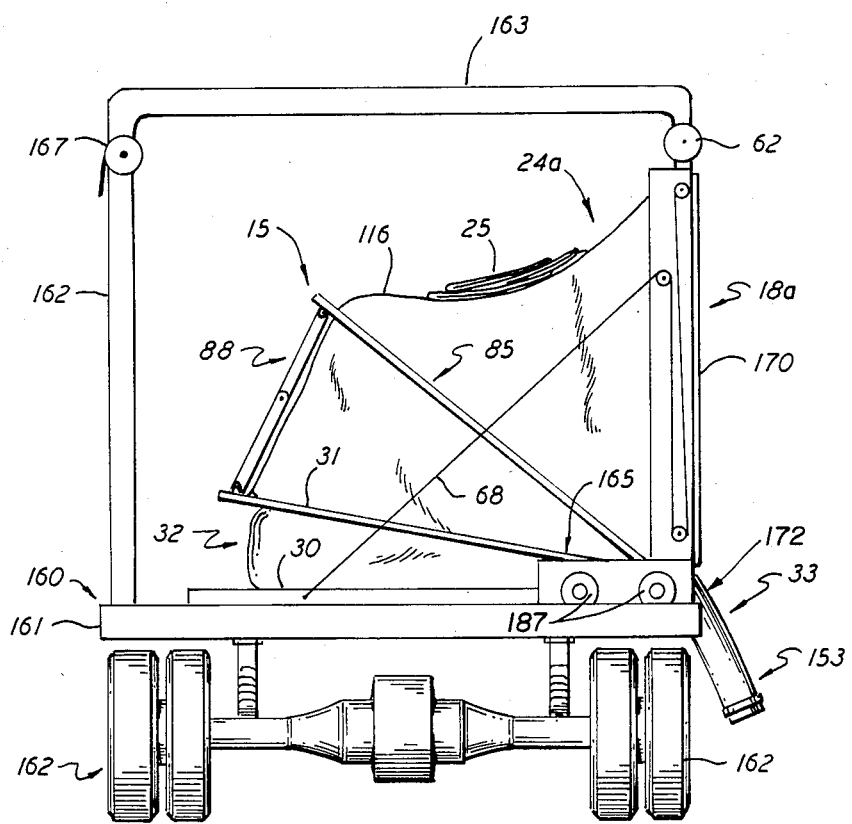
FIG. 22 is an end elevation view showing another embodiment of the invention where a half bin unit is mounted on the side of a flat bed trailer.

Another embodiment of the invention is illustrated in FIG. 22 wherein previously noted parts are referenced with like numbers. In this embodiment, one or more bulk storage units are mounted on a flat bed trailer generally referenced 160. The trailer includes a horizontal bed 161 that is supported by wheels 162 so that it can be transported over the ground. A roof section 163 is supported above the bed upon an open-sided frame 164. Roll-up curtains 167 are suspended from the roof section which can be dropped to enclose the trailer. This type of open-sided trailer is widely used in many geographical areas and has the advantage of being able to be loaded and unloaded from any side.

The storage unit 15 in this embodiment is turned sideways on the bed so that one side of the frame upright 18a is positioned along one side of the trailer. This side of the frame is closed by a fixed wall 170 that provides a discharge slot or opening in the bottom portion thereof for discharge of bulk material from the bin. The opposite side of the frame which faces the bed includes a previously described side assembly comprised of an outer shield 30 and bin floor panel 31 combination that is movable between an open position as shown and a closed position against the side of the frame 18a. Bracket 85 and foldable braces 88 are attached to the bin floor panel as described above and provide a foldable support structure for the flexible bin wall portion 24a.

The frame 18a is mounted upon a carriage 165 for movement about the bed between a stowed position and the operative position as shown. The carriage may include wheels 187 that ride on the floor of the bed. A suitable breaking system is also included to secure the carriage against movement when in either the stowed or operative position. When in the operative position as shown, the spout 33 is released from the bin and pulled through the discharge slot and over the side of the trailer into a discharge area 172 where it can be connected to a conveyor or deposited in a collecting trough (not shown). A number of half units can be mounted side-by-side along the length of the flat bed in a reversed staggered arrangement so that the spouts of alternate units hang down on opposite sides of the trailer.

Because of the unique unloading characteristics of bins according to this invention, the bins can be substantially completely emptied of material during the unloading operations. The support structure provided by bracket 85 and latched braces 88 avoids fold formation in the flexible wall portion of the bin contacting the bulk material being emptied to prevent the bulk material from being trapped in the flexible bin. The bins of the present invention can be quickly erected, or folded and stowed, when desired with a minimum amount of manual effort. Furthermore, the flexible wall portion of the bin of the present invention can be easily detached from the frame and replaced in a matter of minutes, thereby completely avoiding the risk of contamination when transporting such diverse materials as sugar and fertilizer. When stowed, the bins take up an extremely small amount of space in the front of the freight container, and the flexible walls and air bags of the bins are protected by the outer shields from damage.

It will be readily seen that the present invention is not only applicable to convertible freight vehicles, but also to bins that can be selectively erected or stowed in stationary warehouses and the like when needed. The invention is also applicable to stationary bins incorporating the features of the invention. The invention finds further applicability in converting pickup trucks and the like for bulk transport.

While this invention has been described in detail with reference to the specific embodiments set forth above, the invention is not intended to be limited to those specific structures, but is intended to cover any modifications or changes that may come within the scope and spirit of the invention.

What is claimed is:

1. A bin for storing and handling bulk material, the bin having a fill opening through which material is introduced into the bin for storage, and a discharge opening in a bottom portion of the bin through which material stored in the bin is discharged, the bin being erectable over a flat support bed, the bin further including an upright frame that is positionable adjacent to a discharge area of the flat bed to bring the discharge opening of the bin into alignment with the discharge area of the flat bed, the bin further including an outer shield hinged in a lower portion of the frame so that the shield pivots between a closed vertical position against one side of the frame and an open horizontal position away from said frame, the bin having a bin floor panel independently hinged inside the outer shield adjacent the discharge opening of the bin, the bin floor panel being pivotable with the outer shield from the horizontal open position to the vertical closed position, the bin further including a flexible bin wall portion connecting the frame and the bin floor panel to form an enclosure for storage of bulk materials when the bin is in said open position, the flexible bin wall portion being foldable into the frame when the outer shield and the bin floor panel is moved from the open position to the closed position, the bin further including an inflatable bag between the outer shield and the bin floor panel, for independently inclining the floor panel toward the discharge opening when the outer shield is in the horizontal open position to direct bulk material stored in the bin through said discharge opening.

2. The bin of claim 1 further including means for supporting the flexible wall portion of the bin in an erect position for storage of bulk materials when the bin is in said open position.

3. The bin of claim 2 wherein the means for supporting the flexible wall portion of the bin in an erect position includes a foldable support member connected to the bin floor panel for movement therewith, the foldable support member being folded when the bin is in the closed position, the foldable support member being unfolded when the outer shield is moved from the closed position to the horizontal open position, the foldable support member being selectively lockable in the unfolded position.

4. The bin of claim 1 further including a hoist means mounted on the frame that is connected to the outer shield for moving the outer shield between the closed position and the open position.

5. The bin of claim 1 further including a carriage means connected to the frame for transporting the bin from a remote stowed location to an operative location adjacent a discharge area of a flat bed.

6. The bin of claim 5 wherein the flat bed is a portion of the trailer of a truck and the carriage is movable over the bed upon rail means between the stowed location and the operative location.

7. The bin of claim 1 further including a flexible spout connected to the discharge opening of the bin through which material stored in the bin is discharged through the discharge area of the flat bed.

8. The bin of claim 7 further including a gate means at the discharge end of the spout for opening and closing said spout.

9. The bin of claim 1 further including a fixed wall secured to an opposite side of the frame of said shield.

10. The bin of claim 7 further including means for detachably securing the flexible wall portion to upright the frame and the floor panel.

11. The bin of claim 1 further including an extendable loading funnel connected to the fill opening of said bin.

12. The bin of claim 2 wherein the means for supporting the flexible wall portion includes a U-shaped bracket pivotally connected to the bin floor panel and at least one strap means connected to a top wall of the flexible bin wall portion that is hung between the upright frame and the U-shaped bracket for supporting the bin wall portion in an erect position.

13. The bin of claim 12 wherein the U-shaped bracket has a base leg passing over the top wall of the flexible bin wall portion and further including at least one foldable brace for connecting the base leg of the bracket to said floor panel.

14. The bin of claim 13 further including a latch means for locking said brace in an unfolded position whereby the bracket is rigidly connected to the floor panel.

15. The bin of claim 1 wherein said air bag includes an inner bladder and an outer bladder that are separately inflatable.

16. The bin of claim 15 wherein the air bag includes a relief valve for relieving air pressure in the bag when the angular displacement between the outer shield and the bin floor panel reaches a predetermined angle.

17. A bin for storing and handling bulk material, the bin having at least one fill opening through which material is introduced into the bin for storage, and a discharge opening in a bottom portion of the bin through which material stored in the bin is discharged, the bin being erectable over a flat support bed, the bin further including an upright frame that is positionable adjacent to a discharge area of the flat bed to bring the discharge opening of the bin into alignment with the discharge area of the flat bed, the bin further including a pair of outer shields hinged in a lower portion of the frame on opposite sides of the frame so that the shields pivot between closed vertical positions against opposite sides of the frame and open horizontal positions away from said frame, the bin including a bin floor panel independently hinged inside each outer shield adjacent the discharge opening of the bin, each bin floor panel being pivotable with the corresponding outer shield from the horizontal open position to the vertical closed position, the bin further including a flexible bin wall portion connecting the frame and the bin floor panels to form an enclosure for storage of bulk materials when the bin is in said open position, the flexible bin wall portion being foldable into the frame when the outer shields and the corresponding bin floor panels are moved from the open position to the closed position, the bin further including an inflatable bag between each outer shield and the corresponding bin floor panel for independently inclining each floor panel toward the discharge opening when the outer shields are in the horizontal open position to direct bulk material stored in the bin through said discharge opening.

18. The bin of claim 17 further including means for supporting the flexible wall portion of the bin in an erect position for storage of bulk materials when the bin is in said open position.

19. The bin of claim 17 wherein the means for supporting the flexible wall portion of the bin in an erect position includes at least one foldable support member separately connected to each bin floor panel for movement therewith, each foldable support member being folded when the bin is in the closed position, each foldable support member being unfolded when the corresponding outer shield is moved from the closed position to the horizontal open position, each foldable support member being selectively lockable in the unfolded position.

20. The bin of claim 17 further including a hoist means mounted on the frame that is connected to the outer shields for moving the outer shields between the closed position and the open position.

21. The bin of claim 17 further including a carriage means connected to the frame for transporting the bin from a remote stowed location to an operative location adjacent a discharge area of a flat bed.

22. The bin of claim 21 wherein the flat bed is a portion of the trailer of a truck and the carriage is movable over the bed upon rail means between the stowed location and the operative location.

23. The bin of claim 17 further including a flexible spout connected to the discharge opening of the bin through which material stored in the bin is discharged through the discharge area of the flat bed.

24. The bin of claim 23 further including a gate means at the discharge end of the spout for opening and closing said spout.

25. The bin of claim 17 further including means for detachably securing the flexible wall portion to the frame and the floor panels.

26. The bin of claim 17 further including an extendable loading funnel connected to each fill opening of said bin.

27. The bin of claim 18 wherein the means for supporting the flexible wall portion includes a U-shaped bracket pivotally connected to each bin floor panel and at least one strap means connected to a top wall of the flexible bin wall portion that is hung between the upright frame and each U-shaped bracket for supporting the bin wall portion in an erect position.

28. The bin of claim 27 wherein each U-shaped bracket has a base leg passing over the top wall of the flexible bin wall portion and further including at least one foldable brace for connecting each base leg of each bracket to the corresponding floor panel.

29. The bin of claim 28 further including a latch means for locking each brace in an unfolded condition whereby each bracket is rigidly connected to the corresponding floor panel.

30. The bin of claim 17 wherein each of said air bags includes an inner bladder and an outer bladder that are separately inflatable.

31. The bin of claim 30 wherein each air bag includes a relief valve for relieving air pressure in the bag when the angular displacement between the corresponding outer shield and the corresponding bin floor panel reaches a predetermined angle.

32. A freight vehicle within a convertible cargo space comprising a flat support bed of the freight vehicle, the bed having a discharge area, the freight vehicle including a bin for storing and handling bulk material, the bin having at least one fill opening through which material is introduced into the bin for storage, and a discharge opening in a bottom portion of the bin through which material stored in the bin is discharged, the bin being erectable over the flat support bed, the bin further including an upright frame that is positionable adjacent to the discharge area of the flat bed to bring the discharge opening of the bin into alignment with the discharge area of the flat bed, the bin further including a pair of outer shields hinged in a lower portion of the frame on opposite sides of the frame so that the shields pivot between closed vertical positions against opposite sides of the frame and open horizontal positions away from said frame, the bin including a bin floor panel independently hinged inside each outer shield adjacent the discharge opening of the bin, each bin floor panel being pivotable with the corresponding outer shield from the horizontal open position to the vertical closed position, the bin further including a flexible bin wall portion connecting the frame and the bin floor panels to form an enclosure for storage of bulk materials when the bin is in said open position, the flexible bin wall portion being foldable into the frame when the outer shields and the corresponding bin floor panels are moved from the open position to the closed position, the bin further including means for supporting the flexible wall portion of the bin in an erect position for storage of bulk materials when the bin is in said open position, the bin further including an inflatable bag between each outer shield and the corresponding bin floor panel for independently inclining each floor panel toward the discharge opening when the outer shields are in the horizontal open position to direct bulk material stored in the bin through said discharge opening, the bin including carriage means connected to the frame for transporting the bin from a remote stowed location in the freight vehicle to an operative location adjacent the discharge area of said flat bed.

* * * * *